United States Patent [19]

Briere et al.

[11] 4,331,463
[45] May 25, 1982

[54] SELF-CENTERING APPARATUS FOR MAKING OPTICAL FIBERS

[75] Inventors: Alfred D. Briere, Worcester; Richard M. Klein, Framingham, both of Mass.

[73] Assignee: GTE Laboratories Incorporated, Waltham, Mass.

[21] Appl. No.: 276,320

[22] Filed: Jun. 22, 1981

[51] Int. Cl.$^3$ ............................................. C03D 37/02
[52] U.S. Cl. ........................................ 65/13; 65/10.1
[58] Field of Search ............................... 65/10.1, 13, 2

[56] References Cited

U.S. PATENT DOCUMENTS

| | | | |
|---|---|---|---|
| 3,865,564 | 2/1975 | Jaeger et al. | 65/13 X |
| 3,990,873 | 11/1976 | Knetzlstorfer et al. | 65/2 |
| 4,121,920 | 10/1978 | Balkwill | 65/13 |
| 4,135,902 | 1/1979 | Oehrle | 65/2 |
| 4,154,592 | 5/1979 | Bailey | 65/2 |
| 4,249,925 | 2/1981 | Kawashima et al. | 65/13 X |

Primary Examiner—Robert L. Lindsay, Jr.
Attorney, Agent, or Firm—Fred Fisher

[57] ABSTRACT

A self-centering device supports a generally cylindrically shaped workpiece. A pair of parallel, substantially horizontal shares are mounted within a mounting frame and traverse an opening therewithin. A pair of rolling bearings are adapted for reciprocating movement axially along the two shafts, respectively, with a first connecting rod coupled to the two bearings, so that the resulting rod and bearings can be reciprocated in the direction parallel to the axes of the shafts. In similar fashion, two other rolling bearings are adapted for reciprocating movement axially along the shafts, respectively, with a second connecting rod coupled to the latter bearings so that the resulting rod and latter bearing combinations can be reciprocated in the direction parallel to the axes of the shafts. A first connecting rod bearing is adapted for reciprocating movement axially along the first connecting rod. A second connecting rod bearing is adapted for reciprocating movement axially along the second connecting rod. A mounting carriage, coupled to the two connecting rod bearings, house a spherical-seated, self-aligning bearing which can support the workpiece so the axis of the workpiece can be moved at an appreciable angle in any direction, thus supporting the workpiece against the resultant of a force of tension along a generally downward direction and of a force due to gravity. Means can be provided for providing movement to the frame so that the preform can be lowered into a furnace. The preform is self-centering with respect to the device without the necessity of operator intervention and without the necessity of monitoring and feedback of electrical signals to the device.

12 Claims, 5 Drawing Figures

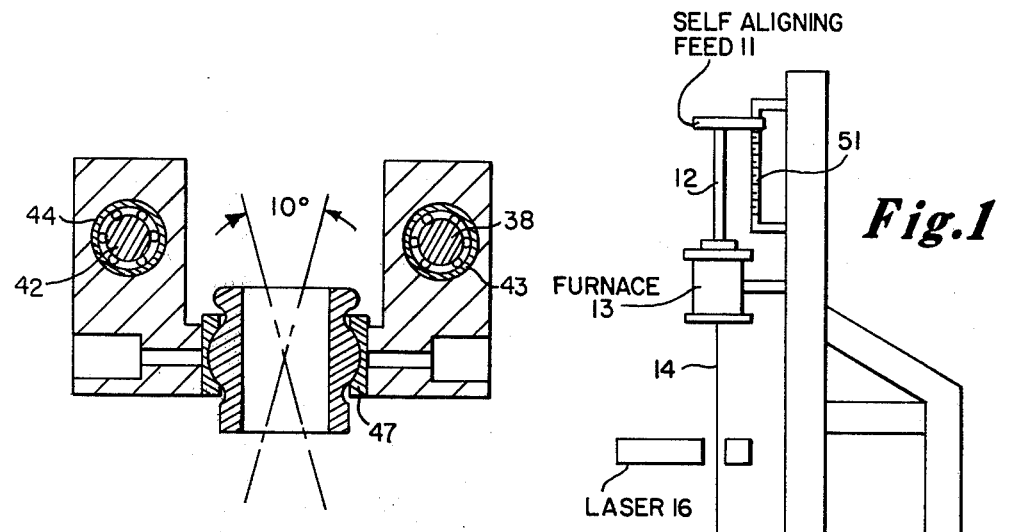
*Fig.1*
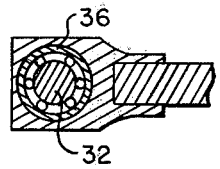
*Fig.5*
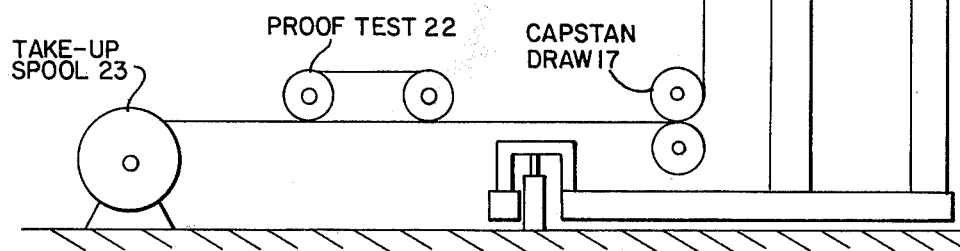

SELF-CENTERING APPARATUS FOR MAKING OPTICAL FIBERS

BACKGROUND OF THE INVENTION

1. Field of the Invention

This invention relates to self-centering apparatus, and, in particular, to self-centering devices for introducing glass preforms into fiber drawing furnaces. Such devices are highly useful in the manufacture of low loss optical fiber. Accordingly, it is a general object of this invention to provide new and improved apparatus and devices of such character.

2. Description of the Prior Art

Various techniques for preparing low loss optical fibers involve initially preparing a preform using one of several vapor phase techniques. The preform, which is a rod of glass about 5 to 20 millimeters in diameter having the same relative radial variation in refractive index as desired in the fiber, is then fed at a controlled rate into a furnace where it softens and is drawn to a fiber by means of a drum or pinch wheel. Conventionally, fiber diameter is monitored and a protective coating is applied while the fiber is being drawn.

In prior art practice, the preform is held in a chuck while it is fed into the furnace. Horizontal alignment can be achieved by initially adjusting the preform position with respect to the furnace by means of micrometer screws; this horizontal position is then fixed through the vertical travel during a run.

The primary disadvantage of the foregoing technique arises from the fact that preforms are often not straight over their entire length because of the method of manufacture. Thus, a preform whose lower end is aligned with the furnace at the start of a run can go out of alignment during the run. This misalignment causes several problems in drawing optical fiber. First, misalignment results in radially non-uniform heating of the preform. This can cause the fiber to be non-circular and, in severe cases, can initiate contact between the preform and the element resulting in mechanical degradation of the resultant fiber and premature failure of the element.

The second problem caused by preform misalignment arises from the fact that turbulence in the furnace increases the magnitude of random fluctuations in fiber diameter. Conventionally, this turbulence, caused by air flow in the furnace, is controlled by irises at the ends of the furnace which are closed as much as possible around the preform on one side and fiber on the other. For preforms that go out of alignment during a run, the irises must be opened wide enough to pass the preform and fiber without contact throughout the run. This results in larger fiber diameter variations than is possible with irises that are more fully closed.

Another problem caused by preform misalignment is that the fiber being drawn becomes misaligned. This causes difficulties in fiber coating, where coating concentricity suffers, as well as in fiber diameter monitoring, where the fiber goes out of the measurement window.

3. Prior Art Statement

As a means of complying with the duty of disclosure set forth at 37 CFR 1.56, the following prior art statement serves as a representation that it includes, in the opinion of the applicants, the closest prior art of which they are aware. Though this statement should not be construed as a representation that a search has been made or that no better art exists, a concise explanation of the relevance of each listed item is that such art was enumerated in the course of a preliminary novelty search.

| U.S. Pat. No. | Patentee | Issue Date |
| --- | --- | --- |
| 3,143,791 | Lanahan et al. | Aug. 11, 1964 |
| 3,396,598 | Grispo | Aug. 13, 1968 |
| 3,613,464 | Archer | Oct. 19, 1971 |
| 3,915,442 | Marantette et al. | Oct. 28, 1975 |
| 4,108,019 | Martin | Aug. 22, 1978 |
| 4,202,512 | Nicholson, Jr. | May 13, 1980 |

Lanahan et al, U.S. Pat. No. 3,143,791, relates to a work positioning table for moving a workpiece relative to a template in any desired horizontal direction so that an associated machine can perform successive operations on the workpiece such as the insertion of components in a printed circuit board. The table includes a heavy base, a longitudinally-movable carriage, a transversely-movable platform for a workpiece, a flat front surface in the base for the template, and a stylus for mating with indentations in the template as the carriage and platform are moved on supporting rods and rails. The platform has a vertical opening which overlaps a carriage opening and a similar opening in the base so that vertical access to the workpiece is provided for extending a machine part therethrough for performing an operation on the workpiece. The movement of either the carriage or the platform or both is by means of ball bearings. When a locating means is centered, an operator uses both hands to depress switches to lower a plunger against resistance of a return spring for component insertion.

Grispo, U.S. Pat. No. 3,396,598, relates to a miropositioner which includes a linear slide mounted on a support; and a control lever which is mounted for universal movement about a pivot point substantially fixed relative to the base member of the linear slide. A first portion of the control lever is arranged to cooperate with the movable member in such a manner that movement of a second portion of the control lever more remote from the pivot point than is the first portion brings about related movement on a reduced scale of the movable member. The control lever is rotatable about its axis and is operatively connected with movable member and the support so that rotation of the control lever brings about movement of the base member of the linear slide relative to the support in a direction perpendicular to the plane.

Archer, U.S. Pat. No. 3,613,464, relates to apparatus for orienting beam directing or viewing apparatus having means for rotatably mounting a sensitive element of the device at the geometrical center of a spherical bearing. One end of a linkage arm is directly or indirectly connected to the device and the other end is then coupled to a mechanism which limits its motion to translation along either of two mutually orthogonal reference axes. Translation along either one of the two reference axes will cause the sensitive element to be rotated about the corresponding orthogonal axis without cross-coupling therebetween.

Marantette et al, U.S. Pat. No. 3,915,442, relates to a rectangular coordinate positioning system in which movement of an elongated carriage in a given direction at right angles to its long dimension is provided by a frame supporting parallel rails running in the given direction. The carriage is mounted to the rails for movement in this given direction. A torque tube has a longitudinal axis parallel to the longitudinal dimension of the carriage at right angles to the direction of the rails, the tube being mounted to the base frame for rotation about its own axis. Identically dimensioned coupling means are provided between opposite end portions of the torque tube and opposite longitudinal means constraining movement of the end portions of the carriage to precisely equal distances in the direction along the rails, respectively. A second pair of parallel rails can be mounted on the carriage to support a work table for movement in a direction at right angles to the first mentioned direction so that the work table itself can be positioned at any coordinate point.

Martin, U.S. Pat. No. 4,108,019, relates to a solar tracking device. A driving shaft, with its longitudinal axis extending parallel to the axis of rotation of the earth, is rotated at a constant speed. A frame is mounted for rotation in azimuth in a first plane which is angularly inclined with respect to the first axis. A tracking head is mounted on the frame for altitudinal rotation about an axis disposed in said first plane and which extends perpendicular to the azimuthal position of the sun with respect to the axis for rotation of the tracking head. Azimuthal drive means comprises a universal joint having a driving member connected to the driving shaft for rotation about its axis in an equitorial plane and a driven member connected to said frame for rotation in said first plane about the frame axis and a centre of gyration located at the intersection of said first axis and said first plane, the driven member being arranged such that its variable angular velocity is synchronized with respect to that of the sun about the frame axis to track the sun in azimuth, altitude drive means driving said tracking head about its axis to track the sun in altitude as said tracking head is driven about said centre of gyration.

Nicholson, U.S. Pat. No. 4,202,512, relates to a level layer winding method and apparatus in which wire can be wound in successive level layers on rotatively driven spools or reels.

Disadvantageously, none of the foregoing art suggests devices for self-centering. No teachings are suggested for use in the manufacture of low loss optical fiber. Some of the prior art fail to suggest rotational or swivel movement of a workpiece.

Another object of this invention is to provide for new and improved devices for holding a glass preform while it is being fed into a fiber-drawing furnace.

Still another object of this invention is to provide for new and improved apparatus for holding a workpiece, wherein the workpiece is self-centeredly supported.

Yet another object of this invention is to provide new and improved mechanisms for self-centering a glass preform during the manufacture of optical fiber without the necessity of operator intervention, and without undue monitoring and feedback schemes.

Still yet another object of this invention is to provide new and improved apparatus for providing high quality, low loss, optical fiber.

In accordance with one embodiment of the invention, a self-centering device for supporting a generally cylindrically shaped workpiece having a central axis includes a mounting frame having an opening therewithin. A pair of parallel, substantially horizontal shafts are mounted within the frame and traverse the opening. A first roller bearing is adapted for reciprocating movement axially along one of the shafts. A second rolling bearing is adapted for reciprocating movement axially along the other of the shafts. A first connecting rod is coupled to the first rolling bearing and to the second rolling bearing so that the resulting rod and rolling bearings combination can be reciprocated in a direction parallel to the axes of the shafts. Third and fourth rolling bearings are adapted for reciprocating movement axially along one and the other, respectively, of the shafts. A second connecting rod is coupled to the third rolling bearing and to the fourth rolling bearing so that the resulting rod and rolling bearings combination can be reciprocated in the direction parallel to the axes of the shafts. Separate connecting rod bearings are adapted for reciprocating movement axially along the first connecting rod and the second connecting rod, respectively. A spherical-seated, self-aligning bearing supports the workpiece so that the workpiece axis can be moved through an appreciable angle in any direction. A mounting carriage is coupled to the connecting rod bearings for housing the spherical-seated, self-aligning bearing for supporting the workpiece against a resultant of a force of tension along a generally downward direction and of a force due to gravity. In accordance with certain features of the invention, the appreciable angle in any direction includes a sweep of nor more than ninety degrees. The sweep can be, for example, twenty-eight degrees. The device can further include means for providing vertical movement to the frame. The two connecting rods can be parallel, and can be spaced apart a fixed distance regardless of orientation with respect to the frame. The four rolling bearings are all movable in unison in a direction parallel to the axes of the shafts, wherein each of the rolling bearings has an axis, and wherein a point on each of the rolling bearing axes form vertices of a rectangle. The workpiece can have a diameter not in excess of twenty millimeters. The workpiece can be adapted to rotate within the spherical-seated, self-aligning bearing.

In accordance with another embodiment of the invention, a self-centering device for introducing a generally cylindrically shaped, but possibly bowed, glass preform having a central axis into a fiber drawing furnace located below the device includes a mounting frame having an opening therewithin. A pair of parallel, substantially horizontal shafts are mounted within the frame and traverse the opening. First and second rolling bearings, respectively, are adapted for reciprocating movement axially along one and the other, respectively, of the shafts. A first connecting rod is coupled to the two rolling bearings so that the resulting rod and rolling bearings combination can be reciprocated in a direction parallel to the axes of the shafts. Third and fourth rolling bearings, respectively, are adapted for reciprocating movement axially along one and the other, respectively, of the shafts. A second connecting rod is coupled to the third and the fourth rolling bearings so that the resulting rod and rolling bearings combination can be reciprocated in a direction parallel to the axes of the shafts. Separate connecting rod bearings are adapted for reciprocating movement axially along the first connecting rod and the second connecting rod, respectively. A spherical-seated, self-aligning bearing supports the glass preform so that the central axis of the preform can be tilted at any angle of up to fourteen degrees from its normal vertical position. A mounting carriage is coupled to the connecting rod bearings for housing the spherical-seated, self-aligning bearing for supporting the preform against a resultant of a force of tension along a generally downward direction and of a force due to gravity, whereby all the rolling bearings are movable in unison in a direction parallel to the axes of the shafts. Each of the rolling bearings has an axis with a point on each of the rolling bearing axes forming vertices of a rectangle. The preform has a diameter not in excess of twenty millimeters. Vertical movement can be provided to the frame so that the preform can be lowered into the furnace. The preform is self-centering with respect to the device, without necessity of operation intervention, and without necessity of monitoring and feedback of electrical signals to the device. In accordance with certain features of the invention, the preform is adapted to rotate within the spherical-seated, self-aligning bearing.

BRIEF DESCRIPTION OF THE DRAWINGS

Other objects, advantages and features of this invention, together with its construction and mode of operation, will become more apparent from the following description, when read in conjunction with the accompanying drawings, in which:

FIG. 1 is an elevational view of a draw tower for producing optical fiber;

FIG. 4 is a cross-sectional view taken along the line 4—4 of FIG. 3; and

FIG. 5 is a partial sectional view taken along the line 5—5 of FIG. 3.

DESCRIPTION OF PREFERRED EMBODIMENTS

Figure 2:
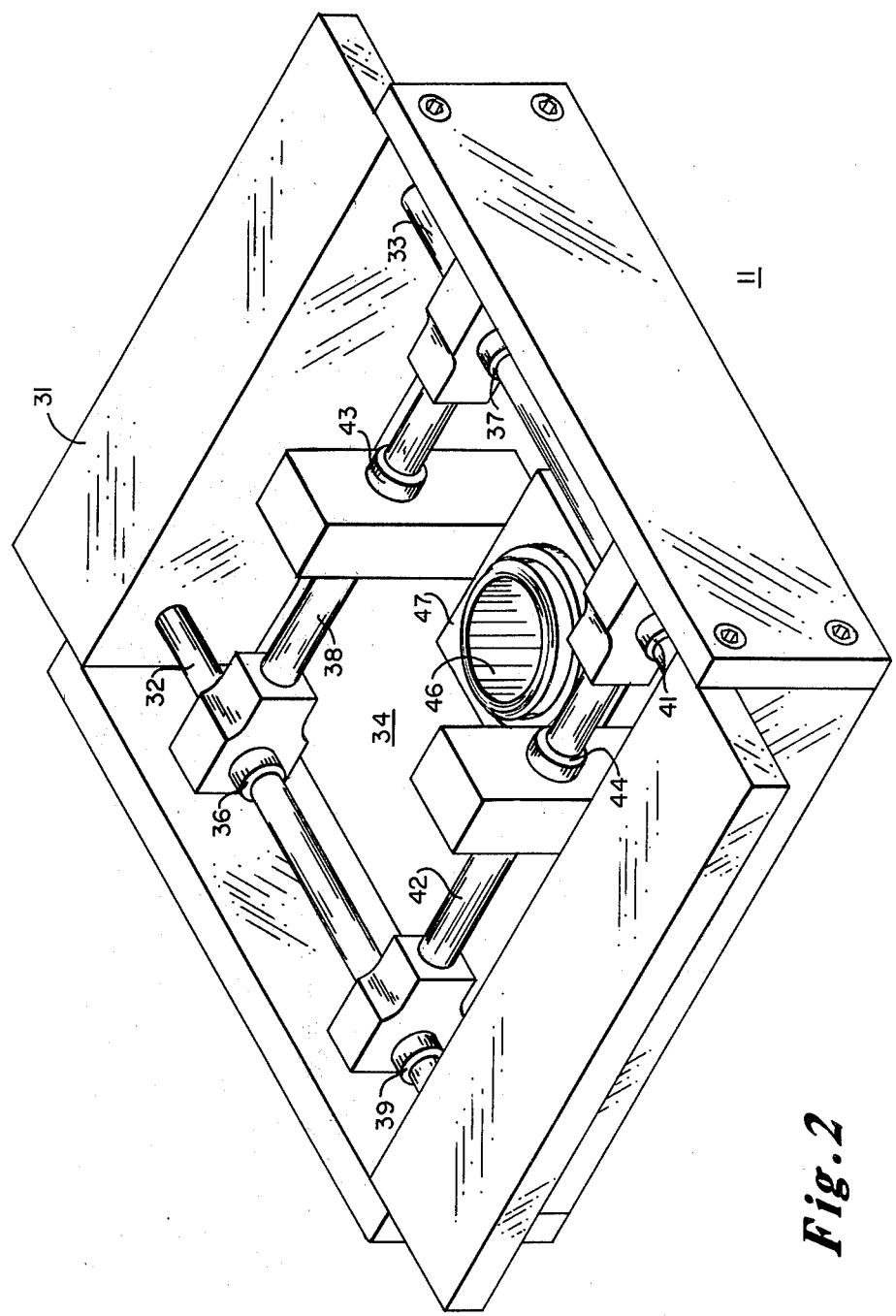
FIG. 2 is a perspective view of a preferred embodiment of a self-centering device in accordance with this invention for introducing preforms into a fiber drawing furnace supported by the draw tower of FIG. 1.

Referring to FIG. 1, there is depicted a draw tower 10 having various components, including a self-centering device 11 in accordance with this invention, which device is suitable for introducing a preform 12 into a fiber drawing furnace 13. Fiber 14, which is pulled from below the furnace 13, passes through a laser 16 which is designed to measure the diameter of the fiber 14 as it is being drawn. The laser mechanism 16 can also provide a feedback signal to a capstan mechanism 17 in order to instruct the draw mechanism to stop, slow down, or speed up. Such can be performed in accordance with techniques well known in the art. The laser unit 16, for example, can be a commercial unit such as Model No. 120F manufactured by Zygo Corporation of Connecticut.

After passing through the laser 16, the fiber 14 passes through a coater 18. The coater 18 is adapted to provide a polymer resin onto the fiber 14, such as, for example, an ultraviolet curable acrylate. Hereafter, the coated fiber passes through an ultraviolet curer 21. The ultraviolet curer 21 cures the coating on the fiber. The ultraviolet curer 21, for example, can be a model F440 which is manufactured by Fusion Systems Corporation of Rockville, Md.

The capstan draw mechanism 17 includes a pair of rubber coated wheels. There is no indentation on the wheels for the fiber 14; the wheels are merely rubber coated. After passing through the capstan draw mechanism 17, the fiber undergoes the proof test 22. The proof test 22 may or may not be in line with the rest of the mechanism. The proof test 22 puts a controlled stress on the fiber 14 in order to weed out any large flaws which could cause low strength breaks. The proof test 22 is shown for illustrative purposes only; it does not constitute a portion of this invention. The draw tower 10 and the units on it as shown in FIG. 1 are illustrative and not definitive. For example, an oven can be used instead of an ultraviolet cure, depending upon the coating that is used. Following the proof test, the finished fiber 14 can be wound upon a suitable take up spool 23.

The self-centering device 11 can support a generally cylindrically shaped workpiece 12 (such a glass preform) having a central axis.

Figure 3:
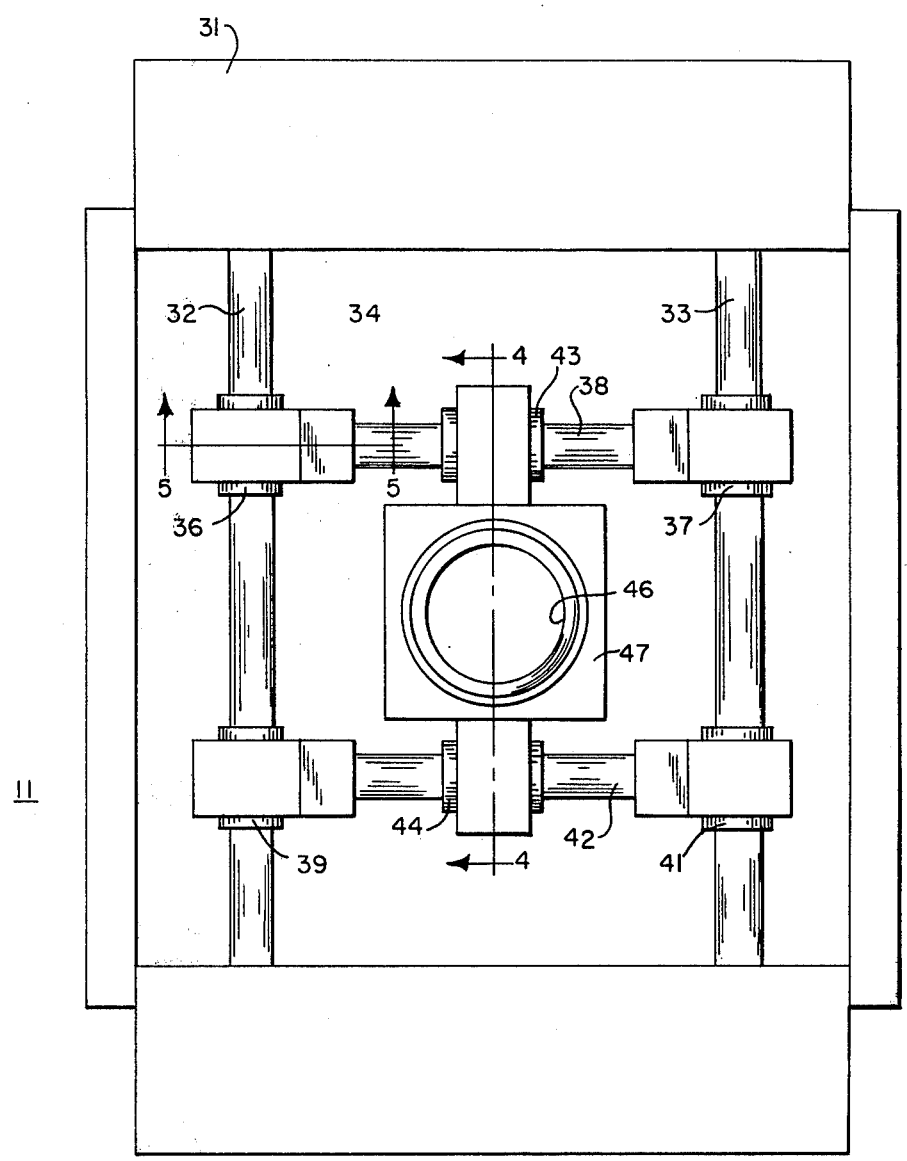
FIG. 3 is a top view of the embodiment shown in FIG. 2.

The self-centering device 11 includes a mounting frame 31, as shown for example in FIGS. 2 and 3. A pair of parallel, substantially horizontal shafts 32, 33 are mounted within the frame 31. A first rolling bearing 36 is adapted for reciprocating movement axially along the shaft 32. A second rolling bearing 37 is adapted for reciprocating movement axially along the shaft 33. A first connecting rod 38 is coupled to the first rolling bearing 36 and to the second rolling bearing 37 so that the resulting rod 38 and rolling bearings 36, 37 can be reciprocated in the direction parallel to the axes of the shafts 32, 33. A third rolling bearing 39 is adapted for reciprocating movement axially along the shaft 32. A fourth rolling bearing 41 is adapted for reciprocating movement axially along the shaft 33. A second connecting rod 42 is coupled to the third rolling bearing 39 and to the fourth rolling bearing 41 so that the resulting rod 42 and bearings 39, 41 can be reciprocated in the direction parallel to the axes of the shafts 32, 33.

A first connecting rod bearing 43 is adapted for reciprocating movement axially along the connecting rod 38. A second connecting rod bearing 44 is adapted for reciprocating movement axially along the second connecting rod 42. A spherical-seated, self-aligning bearing 46 is adapted to support the workpiece 12 so that the axis of the workpiece 12 can be moved through an appreciable angle in any direction. A mounting carriage 47 is coupled to the first connecting rod bearing 43 and to the second connecting rod bearing 44 for housing the spherical-seated, self-aligning bearing 46 for supporting the workpiece 12 against a resultant of a force of tension along a generally downward direction and force due to gravity.

As is indicated above, the workpiece can be a generally cylindrically shaped glass preform having a central axis; however, the glass preform, though cylindrically shaped, can be possibly bowed either intentionally or unintentionally. The spherical-seated, self-aligning bearing 46, for supporting a glass preform, can be tilted at various angles, for example, up to 14 degrees from its normal vertical position.

Vertical movement can be provided to the mounting frame 11 whereby the preform 12 can be lowered into the furnace 13 with the preform 12 being self-centering with respect to the self-centering device 11, without the necessity of operator intervention and without the necessity of monitoring and feedback of electrical signals to the device 11. The vertical movement can be provided to the self-centering device 11 through the means of a micrometer screw 51 associated with the draw tower 10.

The various bearings 36, 37, 39, 41, 43, 44, preferably, are rolling bearings which are primarily designed to carry axial loads. Such bearings contain a row of balls or rollers, held properly spaced by a retainer between a pair of rings having flat or grooved raceways. Some commercial units provide the addition of a third ring mounted on the shaft between two identical outer rings to permit axial thrust in either direction.

The foregoing self-centering device 11, including the spherical bushing 46, can hold preforms of up to 20 millimeters in diameter. Linear and rolling bearings can be used to translate the bushing 46 horizontally. In a preferred embodiment, the spherical bushing 46 permits the preform 12 to tilt up to 14 degrees from its normal vertical position. Such a co-latitude tilt (in a terminology of spherical coordinates) can be any longitudinal angle about the normal vertical position. The bushing 46 is positioned in a mounting carriage 47 which can be translated linearly in two orthogonal horizontal directions.

Though the term "horizontal" is used hereinabove, it is understood that the degree of levelness is not one of required absolute perfection. Several degrees of non-level positioning is permissible, but not preferable.

Because of the freedom of movement provided by this invention, and the ease with which that movement is initiated in response to a driving force, the neckdown region of a preform 12 held by the device 11 tends to stay in the center of the furnace 13 hot zone by means of the normal tension of the fiber 14 being drawn. Thus, the device 11 is self-centering.

All of the advantages resulting from having the preform 12 and the drawn fiber 14 properly aligned have been achieved. To demonstrate some of these advantages, fibers were drawn from commercially fused silica rods which were 0.8 centimeters in diameter and 61 centimeters long. The rods were intentionally bowed in order to simulate nonperfect preforms, and fibers which had nominal diameters of 125 microns were drawn from them using both the conventional chuck holder, and the self-centering device in accordance with this invention. Fiber diameter was measured during the runs to determine the quality of the draw. The results are as follows:

| Feed Mechanism | Bow | Diameter Deviation (98% of Data) |
| --- | --- | --- |
| Conventional chuck | 2.4 millimeters | ± 1.43 microns |
| Self-centering device | 2.1 millimeters | ± 0.65 microns |
| | 3.3 millimeters | ± 0.68 microns |

Thus, it is observed that the use of the self-centering device, in accordance with this invention, reduces diameter variations in fibers drawn from imperfect preforms by more than a factor of two. Moreover, the magnitude of the variations are not a sensitive function of the amount of distortion in the preform.

Other modifications will become apparent to those ordinarily skilled in the art without departing from the spirit and scope of the invention. It is intended that this invention be limited solely by the scope of the allowed claims.

What is claimed is:

1. A self-centering device for supporting a generally cylindrically shaped, glass preform having a central axis into a fiber drawing furnace located below said device comprising
a mounting frame having an opening therewithin;
a pair of parallel, substantially horizontal shafts mounted within said frame and traversing said opening;
a first rolling bearing adapted for reciprocating movement axially along one of said shafts;
a second rolling bearing adapted for reciprocating movement axially along the other of said shafts;
a first connecting rod coupled to said first rolling bearing and to said second rolling bearing so that the resulting rod and rolling bearings combination can be reciprocated in a direction parallel to the axes of said shafts;
a third rolling bearing adapted for reciprocating movement axially along said one of said shafts;
a fourth rolling bearing adapted for reciprocating movement axially along said other of said shafts;
a second connecting rod coupled to said third rolling bearing and to said fourth rolling bearing so that the resulting rod and roller bearings combination can be reciprocated in said direction parallel to said axes of said shafts;
a first connecting rod bearing adapted for reciprocating movement axially along said first connecting rod;
a second connecting rod bearing adapted for reciprocating movement axially along said second connecting rod;
a spherical-seated, self-aligning bearing for supporting said workpiece so that said axis of said workpiece can be moved through an appreciable angle in any direction; and
a mounting carriage, coupled to said first connecting rod bearing and to said second connecting rod bearing, for having said spherical-seated, self-aligning bearing for supporting said glass preform against a resultant of a force of tension along a generally downward direction and of a force due to gravity.

2. The device as recited in claim 1 wherein said appreciable angle in any direction includes a sweep of no more than ninety degrees.

3. The device as recited in claim 1 wherein said appreciable angle in any direction includes a sweep of twenty-eight degrees.

4. The device as recited in claim 1 further comprising means for providing vertical movement to said frame.

5. The device as recited in claim 1 wherein said first connecting rod is parallel to said second connecting rod.

6. The device as recited in claim 5 wherein said first connecting rod and said second connecting rod remain spaced apart a fixed distance regardless of orientation with respect to said frame.

7. The device as recited in claim 1 wherein said first rolling bearing, said second rolling bearing, said fourth rolling bearing, and said third rolling bearing are all movable in unison in a direction parallel to the axes of said shafts.

8. The device as recited in claim 7 wherein each of said rolling bearings has an axis, and wherein a point on each of said rolling bearing axes form vertices of a rectangle.

9. The device as recited in claim 1 wherein said workpiece has a diameter not in excess of twenty millimeters.

10. The device as recited in claim 1 wherein said workpiece is adapted to rotate within said spherical-seated, self-aligning bearing.

11. A self-centering device for introducing a generally cylindrically shaped, but possibly bowed, glass preform having a central axis into a fiber drawing furnace located below said device comprising
a mounting frame having an opening therewithin;

a pair of parallel, substantially horizontal shafts mounted within said frame and traversing said opening;

a first rolling bearing adapted for reciprocating movement axially along one of said shafts;

a second rolling bearing adapted for reciprocating movement axially along the other of said shafts;

a first connecting rod coupled to said first rolling bearing and to said second rolling bearing so that the resulting rod and rolling bearings combination can be reciprocated in a direction parallel to the axes of said shafts;

a third rolling bearing adapted for reciprocating movement axially along said one of said shafts;

a fourth rolling bearing adapted for reciprocating movement axially along said other of said shafts;

a second connecting rod coupled to said third rolling bearing and to said fourth rolling bearing so that the resulting rod and rolling bearing combination can be reciprocated in a direction parallel to said axes of said shafts;

a first connecting rod bearing adapted for reciprocating movement axially along said first connecting rod;

a second connecting rod bearing adapted for reciprocating movement axially along said second connecting rod;

a spherically-seated, self-aligning bearing for supporting said glass preform so that said central axis of said preform can be tilted at any angle of up to fourteen degrees from its normal vertical position;

a mounting carriage, coupled to said first connecting rod bearing and to said second connecting rod bearing, for housing said spherical-seated, self-aligning bearing for supporting said preform against a resultant of a force of tension along a generally downward direction and of a force due to gravity, whereby all said rolling bearings are movable in unison in a direction parallel to the axes of said shafts, wherein each of said rolling bearings has an axis with a point on each of said rolling bearing axes forming vertices of a rectangle, and wherein said preform has a diameter not in excess of twenty millimeters; and means for providing vertical movement to said frame whereby said preform can be lowered into said furnace and said preform is self-centering with respect to said device, without necessity of operator intervention, and without necessity of monitoring and feedback of electrical signals to said device.

12. The device as recited in claim 11 wherein said preform is adapted to rotate within said spherical-seated, self-aligning bearing.

* * * * *